United States Patent
Wakasono et al.

(10) Patent No.: US 10,556,178 B2
(45) Date of Patent: Feb. 11, 2020

(54) GAME SYSTEM, METHOD OF CONTROLLING GAME SYSTEM, AND NONVOLATILE RECORDING MEDIUM READABLE BY COMPUTER DEVICE

(71) Applicant: CAPCOM CO., LTD., Osaka (JP)

(72) Inventors: Koji Wakasono, Osaka (JP); Kazuki Kitamura, Osaka (JP)

(73) Assignee: CAPCOM CO., LTD, Osaka (JP)

( * ) Notice: Subject to any disclaimer, the term of this patent is extended or adjusted under 35 U.S.C. 154(b) by 48 days.

(21) Appl. No.: 15/760,382

(22) PCT Filed: Sep. 13, 2016

(86) PCT No.: PCT/JP2016/004162
§ 371 (c)(1),
(2) Date: Mar. 15, 2018

(87) PCT Pub. No.: WO2017/047078
PCT Pub. Date: Mar. 23, 2017

(65) Prior Publication Data
US 2018/0256977 A1 Sep. 13, 2018

(30) Foreign Application Priority Data
Sep. 16, 2015 (JP) .................................. 2015-182490

(51) Int. Cl.
*A63F 9/00* (2006.01)
*A63F 13/525* (2014.01)
(Continued)

(52) U.S. Cl.
CPC ........ *A63F 13/525* (2014.09); *A63F 13/5378* (2014.09); *A63F 13/54* (2014.09); *A63F 13/822* (2014.09); *A63F 13/5258* (2014.09)

(58) Field of Classification Search
None
See application file for complete search history.

(56) References Cited

U.S. PATENT DOCUMENTS

| | | | |
|---|---|---|---|
| 7,850,525 B2 * | 12/2010 | Shimizu | A63F 13/10 463/31 |
| 8,221,237 B2 * | 7/2012 | Nakayama | A63F 13/10 463/35 |

(Continued)

OTHER PUBLICATIONS

"Metal Gear Solid Peace Walker, How to Play, Sneaking (surround indicator)," [online], Apr. 29, 2010, Konami Digital Entertainment Co.,Ltd., [searched on Sep. 2, 2015], Internet <URL: http://www.konami.jp/mgs_pw/jp/howto/ sneaking.html> together with its partial machine English translation (cited in Specification).

(Continued)

*Primary Examiner* — Seng H Lim
(74) *Attorney, Agent, or Firm* — IP Business Solutions, LLC

(57) ABSTRACT

A control unit includes: a virtual space generating unit configured to generate the virtual space and display the virtual space on a display unit; a character control unit configured to control an action of the player character based on the operation of a operating unit by the user; a sound detecting unit configured to detect a sound generated place in a predetermined region determined based on a position of the player character in the virtual space; a map display unit configured to display a simplified map in the game screen image, the simplified map simply displaying the predetermined region of the virtual space; and a sound generated place display unit configured to display the sound generated place in the predetermined region at a corresponding position on the simplified map.

7 Claims, 6 Drawing Sheets

(51) Int. Cl.
*A63F 13/5378* (2014.01)
*A63F 13/54* (2014.01)
*A63F 13/822* (2014.01)
*A63F 13/5258* (2014.01)

(56) References Cited

U.S. PATENT DOCUMENTS

2007/0293313 A1* 12/2007 Shimizu .................. A63F 13/10
　　　　　　　　　　　　　　　　　　　　　463/31
2009/0137314 A1* 5/2009 Nakayama .............. A63F 13/10
　　　　　　　　　　　　　　　　　　　　　463/35

OTHER PUBLICATIONS

Metal Gear Solid Peace Walker Technical CO-OPS Guide, 1st print, Enterbrain, Inc., Sep. 15, 2010 (Sep. 15, 2010), p. 0047 (cited in ISR).
International Search Report issued for corresponding PCT/JP2016/004162 application.
"Metal Gear Solid Peace Walker Technical CO-OPS Guide", 1st print, Enterbrain, Inc., Sep. 15, 2010 (Sep. 15, 2010), p. 0047 with partial English machine translation (Printed version).

* cited by examiner

GAME SYSTEM, METHOD OF CONTROLLING GAME SYSTEM, AND NONVOLATILE RECORDING MEDIUM READABLE BY COMPUTER DEVICE

TECHNICAL FIELD

The present invention relates to a game system configured to control an action of a character in a virtual game space, a method of controlling the game system, and a nonvolatile recording medium readable by a computer device.

BACKGROUND ART

Conventionally, there are games, such as action games and roll-playing games, in which a player character acts in a virtual game space in accordance with an operation of a user to attack an enemy character or the like. One example of such games is a game including a game stage where battles take place in a virtual space in which recognition of positions of other characters (such as friend characters and/or enemy characters) is limited by, for example, the existence of a shielding matter such as a wall. For example, a game may include a game stage where close battles with enemy characters take place in a building including a plurality of rooms. To facilitate the recognition of the positions of the enemy characters in such games, known is a mode in which the positions of the other characters can be displayed on a simplified map that displays at least a part of a game space where a user can act.

CITATION LIST

Non-Patent Literature

NPLT 1: "METAL GEAR SOLID PEACE WALKER, HOW TO PLAY, Sneaking (surround indicator)," [online], Apr. 29, 2010, Konami Digital Entertainment Co., Ltd., [searched on Sep. 2, 2015], Internet <URL: http://www.konami.jp/mgs#pw/jp/howto/sneaking.html>

SUMMARY OF INVENTION

Technical Problem

However, if the positions of the enemy characters are always displayed on the simplified map, the user can always recognize the positions of the enemy characters who hide behind the shielding matters. Therefore, it is hardly effective that the enemy characters hide behind the shielding matters. Especially in a multiplay game in which battles take place by dividing a plurality of users into friends and enemies, the enemy characters are also operated by the users. Therefore, the existence of the simplified map that always displays the positions of the enemy characters reduces a strategic effect of hiding behind the shielding matters. In contrast, when the simplified map displays the positions of the friend characters but does not display the positions of the enemy characters, the positions of the enemy characters are unknown as long as the enemy characters cannot be visually observed. According to such display mode, the strategic effect in the game is not diversified.

Further, as described in NPLT 1, there is a game in which a player character can be equipped with a radar showing a direction of generation of sound. Such radar displays a waveform in accordance with the volume of the generated sound in an approximate direction in which a source of generation of the sound is located based on the player character. Therefore, when the sound is generated, the waveform of the sound is displayed on at least about one fourth to one third of the radar. As above, the radar just tells an approximate position of the source of generation of the sound. Therefore, an effect obtained by the radar as a tool that specifies the positions of the enemy characters is too vague.

An object of the present invention is to provide a game program and a game system each capable of providing a game including a high strategic effect to users by using sound information.

Solution to Problem

A game system according to one aspect of the present invention is a game system including: a display unit configured to display as a game screen image an image taken by a virtual camera provided in a virtual space; an operating unit configured to operate a player character who acts in the virtual space; and a control unit configured to advance a game in accordance with an operation of a user to the operating unit, wherein the control unit includes: a virtual space generating unit configured to generate the virtual space and display the virtual space on the display unit; a character control unit configured to control an action of the player character based on the operation of the operating unit by the user; a sound detecting unit configured to detect a sound generated place in a predetermined region determined based on a position of the player character in the virtual space; a map display unit configured to display a simplified map in the game screen image, the simplified map simply displaying the predetermined region of the virtual space; and a sound generated place display unit configured to display the sound generated place in the predetermined region at a corresponding position on the simplified map.

Advantageous Effects of Invention

The present invention can provide a game system, a method of controlling the game system, and a nonvolatile recording medium readable by a computer device, each capable of providing a high strategic game to users by using sound information.

DESCRIPTION OF EMBODIMENTS

Figure 1:
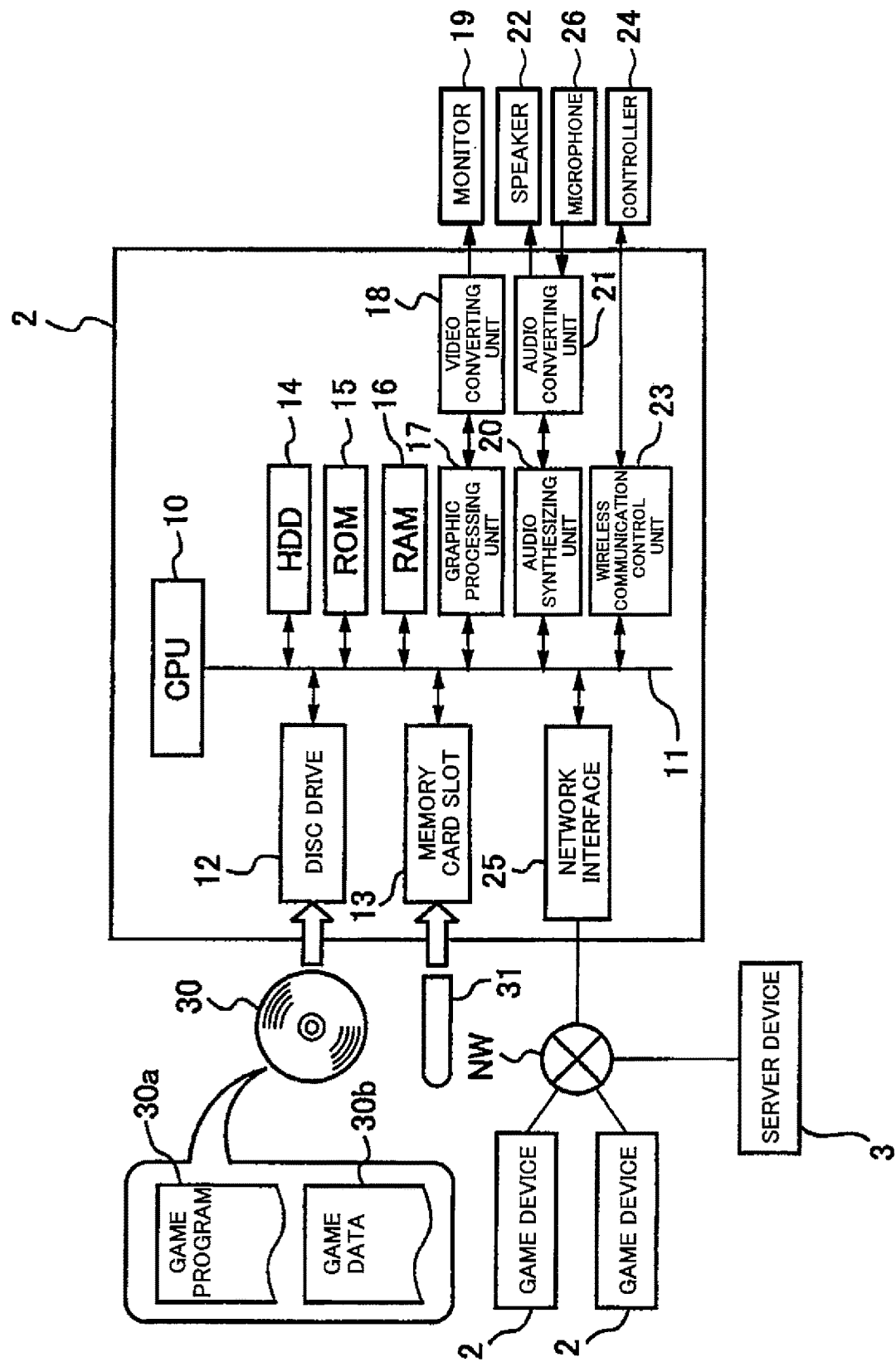
FIG. 1 is a block diagram showing a hardware configuration of a game device according to the present embodiment.

A game system according to one aspect of the present invention is a game system including: a display unit configured to display as a game screen image an image taken by a virtual camera provided in a virtual space; an operating unit configured to operate a player character who acts in the virtual space; and a control unit configured to advance a game in accordance with an operation of a user to the operating unit, wherein the control unit includes: a virtual space generating unit configured to generate the virtual space and display the virtual space on the display unit; a character control unit configured to control an action of the player character based on the operation of the operating unit by the user; a sound detecting unit configured to detect a sound generated place in a predetermined region determined based on a position of the player character in the virtual space; a map display unit configured to display a simplified map in the game screen image, the simplified map simply displaying the predetermined region of the virtual space; and a sound generated place display unit configured to display the sound generated place in the predetermined region at a corresponding position on the simplified map.

The sound detecting unit may detect volume of sound generated at the generated place, and the sound generated place display unit may display a display object at a position on the simplified map, the position corresponding to the sound generated place, the display object varying depending on the volume of the sound.

The display object may have a conical shape, and an area of a bottom surface of the display object and a height of the display object may increase as the volume of the sound increases.

A method of controlling a game system according to another aspect of the present invention includes: a virtual space generating step of generating a virtual space and displaying an image as a game screen image on a display unit connected to the game system, the image being taken by a virtual camera provided in the virtual space; a character controlling step of controlling an action of a player character based on an operation of an operating unit by a user, the player character acting in the virtual space; a sound detecting step of detecting a sound generated place in a predetermined region determined based on a position of the player character in the virtual space; a map displaying step of displaying a simplified map in the game screen image, the simplified map simply displaying the predetermined region of the virtual space; and a sound generated place display step of displaying the sound generated place in the predetermined region at a corresponding position on the simplified map.

A nonvolatile recording medium according to yet another aspect of the present invention is a nonvolatile recording medium storing a command executable by a control unit of a computer device, the nonvolatile recording medium being readable by the computer device, the command including: a virtual space generating step of generating a virtual space and displaying an image as a game screen image on a display unit connected to a game system, the image being taken by a virtual camera provided in the virtual space; a character controlling step of controlling an action of a player character based on an operation of an operating unit by a user, the player character acting in the virtual space; a sound detecting step of detecting a sound generated place in a predetermined region determined based on a position of the player character in the virtual space; a map displaying step of displaying a simplified map in the game screen image, the simplified map simply displaying the predetermined region of the virtual space; and a sound generated place display step of displaying the sound generated place in the predetermined region at a corresponding position on the simplified map.

Hereinafter, a game system, a method of controlling the game system, and a nonvolatile recording medium readable by a computer device according to an embodiment of the present invention will be explained in reference to the drawings.

Outline of Game

The following will explain as an example an action game executed by a home-use game device. The action game according to the present embodiment progresses in such a manner that a player character who acts in a virtual game space is operated to fight against enemy characters to achieve a predetermined goal, such as to annihilate the enemy characters or to reach a predetermined position in the game space. Especially, the present game can realize multiplay in which progresses while a plurality of player characters corresponding to a plurality of users cooperate as a team to fight against the enemy characters. According to the multiplay, a plurality of users in the same team are required to act systematically and strategically to more advantageously advance the game main story.

Before starting the game main story, matching processing is executed, i.e., a first user (host user) creates a session, and other users join the session. When the other users join, the other users as guest users form a team with the host user and cooperate to advance the game main story.

Enemy characters who hinder the progress of the player characters appear at respective stages in the game main story. The enemy characters may be non-player characters or may be one or a plurality of player characters belonging to a different team.

Hardware Configuration

The configuration of the game device that realizes the above-described game will be explained. The game system according to the present embodiment is constituted by: a below-described game device 2; a monitor (display unit) 19 connected to the game device 2; and external devices such as a speaker 22 and a controller (operating unit) 24. The game system according to the present embodiment can execute the game based on a game program 30a and game data 30b read from a disc-shaped storage medium 30. Hereinafter, for ease of explanation, the game system may be simply referred to as the game device 2.

FIG. 1 is a block diagram showing a hardware configuration of the game device 2 in the present embodiment. As shown in FIG. 1, the game device 2 is communicable with other game devices 2 and a server device 3 through a communication network NW such as the Internet or a local area network (LAN). The game device 2 includes a computer processing unit (CPU) 10 that is a computer configured to control operations of the game device 2. A disc drive 12, a memory card slot 13, a hard disc drive (HDD) 14, a read only memory (ROM) 15, and a random access memory (RAM) 16 are connected to the CPU 10 through a bus 11. The HDD 14, the ROM 15, and the RAM 16 constitute a program storage unit.

A graphic processing unit 17, an audio synthesizing unit 20, a wireless communication control unit 23, and a network interface 25 are connected to the CPU 10 through the bus 11.

The graphic processing unit 17 draws a game image, including the game space and the characters, in accordance with an instruction from the CPU 10. Further, the external monitor 19 is connected to the graphic processing unit 17 through a video converting unit 18. The game image drawn by the graphic processing unit 17 is converted into a moving image format by the video converting unit 18 to be displayed on the monitor 19.

The audio synthesizing unit 20 reproduces and synthesizes digital game sound in accordance with an instruction from the CPU 10. Further, the external speaker 22 is connected to the audio synthesizing unit 20 through an audio converting unit 21. Therefore, the game sound reproduced and synthesized by the audio synthesizing unit 20 is decoded into an analog format by the audio converting unit 21 to be output through the speaker 22 to an outside.

Further, the audio synthesizing unit 20 can acquire data generated by coding, for example, voice of a user into a digital format by the audio converting unit 21, the voice being input through a microphone 26 provided at a headset, the controller 24, or the like connected to the game device 2. The audio synthesizing unit 20 can transmit the acquired data as input information to the CPU 10.

The wireless communication control unit 23 includes a 2.4 GHz band wireless communication module. The wireless communication control unit 23 is wirelessly connected to the controller 24 attached to the game device 2 and can transmit data to and receive data from the controller 24. The user can operate an operator (described later), such as a button, provided at the controller 24 to input a signal to the game device 2. Thus, the user can control the actions of the player character displayed on the monitor 19. The network interface 25 connects the game device 2 to the communication network NW such as the Internet or a LAN and is communicable with other game devices 2 and the server device 3. Then, the game device 2 is connected to other game devices 2 through the communication network NW, and transmission and reception of data are performed among these game devices 2. With this, a plurality of player characters can be displayed in the same game space in sync with one another.

Functional Configuration of Game Device

Figure 2:
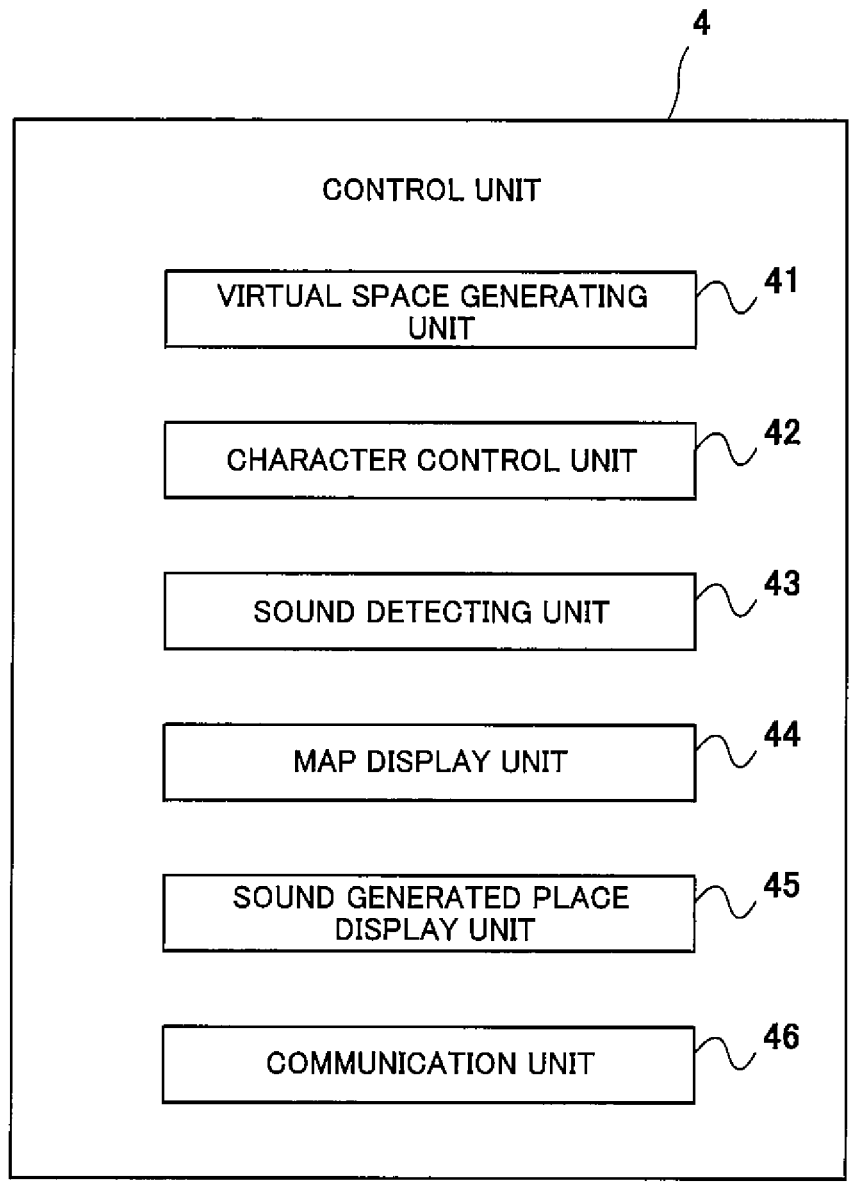
FIG. 2 is a block diagram showing a functional configuration of the game device shown in FIG. 1.

FIG. 2 is a block diagram showing a functional configuration of the game device 2 shown in FIG. 1. The game device 2 shown in FIG. 1 operates as a computer including a control unit 4, the control unit 4 including the CPU 10, the HDD 14, the ROM 15, the RAM 16, the graphic processing unit 17, the video converting unit 18, the audio synthesizing unit 20, the audio converting unit 21, the network interface 25, and the like. As shown in FIG. 2, the control unit 4 of the game device 2 executes the game program 30a of the present invention to achieve functions, such as a virtual space generating unit 41, a character control unit 42, a sound detecting unit 43, a map display unit 44, a sound generated place display unit 45, and a communication unit 46.

The virtual space generating unit 41 generates a virtual space (game space) where the player character operated by the user acts. The virtual space generating unit 41 generates the virtual game space where the characters act, also generates the characters who act in the game space, and displays the virtual game space and the characters on the monitor 19. For example, the virtual space generating unit 41 reads data of objects, textures, and the like contained in the game data 30b in accordance with a movement of the player character to generate a three-dimensional virtual game space. Further, to display the game space on the monitor 19 of the game device 2, the virtual space generating unit 41 generates a two-dimensional image taken by a predetermined virtual camera provided in the generated game space and displays the two-dimensional image as a game screen image on the monitor 19.

The character control unit 42 controls at least actions of a character (player character), corresponding to the user who operates the computer, in accordance with an operation input to the controller 24 by the user or a state of progress of the game. Further, the character control unit 42 controls actions of non-player characters who act in the game space.

The sound detecting unit 43 detects a sound generated place in a predetermined region determined based on the position of the player character in the virtual space. The map display unit 44 displays a simplified map which simply displays the predetermined region of the virtual space in the game screen image. The sound generated place display unit 45 displays the sound generated place of the predetermined region at a corresponding position on the simplified map. Details of sound generated place display processing will be described later.

The communication unit 46 transmits data to and receives data from other computers, operated by other users who join the game, to advance the game in sync with one another. It should be noted that the game may be an online game in which when the computers of the plurality of game devices 2 communicate with one another, the computers connect to a predetermined server, and the server manages the progress of the game. Or, the game may be a P2P (peer-to-peer) type communication game in which: a predetermined matching server performs matching of a plurality of computers in accordance with requests from the computers to the predetermined matching server; and the plurality of matched computers communicate with one another to advance the game.

For example, in a P2P communication type game, first, the computer of a first user (host user) transmits a session creation request signal to the matching server. Based on the session creation request signal, the computer operated by the host user or the matching server creates the session. Information regarding the created session is incorporated in a session list and temporarily stored in the matching server. On the other hand, when other user (guest user) joins the session created by any of the host users, the computer of the guest user transmits a session information request signal to the matching server based on a predetermined operation of the guest user. The matching server transmits the stored session list to the computer of the guest user, and the computer of the guest user displays the session list on the game screen image. When the guest user selects one of the sessions in the session list, the computer of the guest user transmits a session joining signal to the matching server. The matching server transmits information (for example, game data, character data, and the like of other users who join the session) necessary for the P2P communication to the computers of the users who join the session. Then, the P2P communication is performed among the computers of the users who join the session. Thus, the session is established.

After the session is established, the character corresponding to the other user is controlled by the character control unit 42 of the computer of the other user. Control information of the other user is transmitted to the computer of the first user through the communication unit 46, and the computer of the first user controls the operations of the character corresponding to the other user in the same game space based on the control information of the other user.

The session may be created in a network server (such as the matching server) provided at a communication channel between the computer of the first user and the computer of the other user or may be created in any of the computer of the first user and the computer of the other user. In the present embodiment, the first user (host user) among a plurality of users creates the session, and the other users (guest users) join the session. Thus, at a stage where the session is created, the plurality of users can advance the game in the same game space.

In the present game, some of the plurality of users in the above session form a team for cooperating in the game space to advance the game. However, all of the plurality of users in the session may belong to the same team. In this case, the enemy characters are non-player characters. Instead of this, each of the plurality of users in the session may belong to any of a plurality of teams. In this case, the plurality of teams can fight against one another. To be specific, the operations of the enemy characters who are opponents against which the player characters of the users belonging to one team are controlled based on the operations of the users belonging to a different team. In this case, the non-player characters may exist as a third force. The following will mainly explain a game in which the player character operated by the first user, the enemy character operated by the other user, and a zombie character that is the non-player character exist.

As above, the communication unit 46 transmits data to and receives data from the other computer, operated by other user belonging to one session and one team, to advance the game in sync with each other. Further, the communication unit 46 also transmits data to and receives data from the other computer, operated by other user belonging to the same session but a different team, to advance the game in sync with each other.

After the session is created, the computer sets the game space where the player characters of the users belonging to the session act and reads data of the game space. In addition, the computer sets initial positions of the player characters who join the session and arranges the player characters in the game space.

According to the present game, for example, when power supply of the game device 2 is turned on, a game title screen image is displayed. When an input for loading past game data of the user is performed on the game title screen image or the like, the game data is read, and an initial setting screen image based on the game data is displayed. After various setting operations on the initial setting screen image are performed, a play mode selection screen image is displayed. In the selection screen image, the user can make a choice from a plurality of play modes such as a single play mode in which the characters other than the player character operated by the user are non-player characters and a multi-play mode in which a plurality of player characters corresponding to a plurality of users cooperate as a team to advance the game main story while fighting against the enemy characters. When the multiplay is selected in the play mode selection screen image, a session creation screen image is displayed, and a session is created among a plurality of computers based on a predetermined operation. After the session is created, loading of game data and initial settings are performed in a plurality of computers in which the session is created. After they are completed, the game main story is started. In game main story, the users can operate the player characters. Thus, the game main story progresses.

Figure 3:
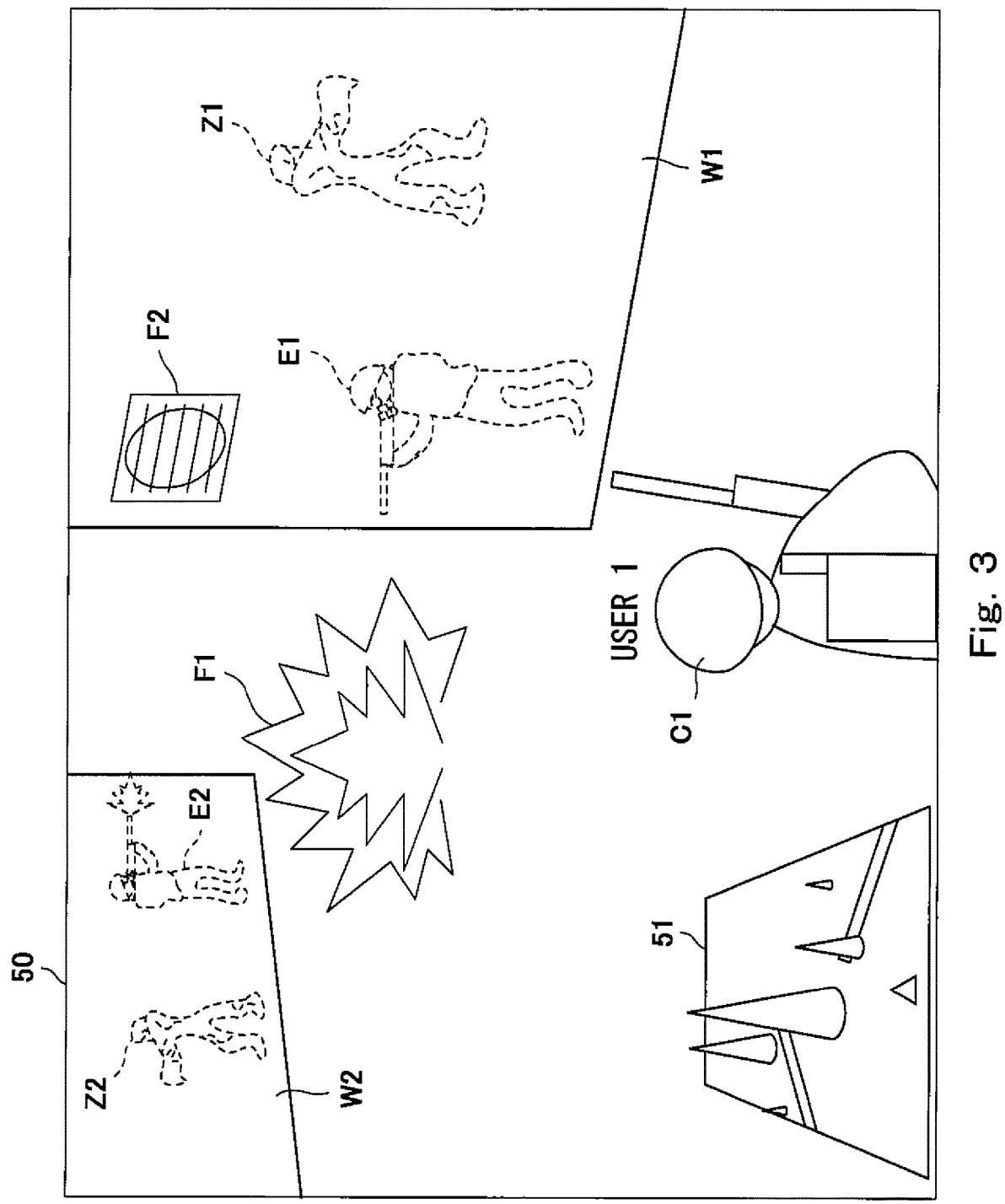
FIG. 3 is a diagram showing an example of a game screen image in the present embodiment.

FIG. 3 is a diagram showing an example of the game screen image in the present embodiment. As shown in FIG. 3, in a game screen image 50, an image around the position of a player character C1 in the game space is displayed as a main game image. The player character C1 is operated by a user 1 who performs an input to the computer. In the game screen image 50 in the game main story, an image generated by photographing the game space by a virtual camera provided behind the player character C1 is displayed. When enemy characters E1 and E2 operated by other users, zombie characters Z1 and Z2 that are non-player characters, a friend character that is operated by another user or is a non-player character, other objects, and the like are located at positions within a field of view of the virtual camera in addition to the player character C1 operated by the user 1, they are displayed at the positions in the game screen image 50.

In FIG. 3, the enemy characters E1 and E2 and the zombie characters Z1 and Z2 that are the non-player characters hide behind wall objects W1 and W2 that are the shielding matters from the viewpoint of the player character C1. In the example of FIG. 3, for convenience sake, the enemy characters E1 and E2 are shown by broken lines. However, in the actual game, the enemy characters E1 and E2 behind the wall objects W1 and W2 are not usually shown. To be specific, the user who operates the player character C1 cannot find out whether or not the enemy characters E1 and E2 are hiding and cannot find out hiding positions of the enemy characters E1 and E2. Further, in FIG. 3, an explosion effect F1 is displayed on the game screen image 50. The explosion effect F1 is generated when, for example, the enemy character E1 uses a bomb, and the bomb is activated (explodes) at a predetermined position. A ventilation fan F2 that is a fixed object is provided at an upper unit of the wall object W1.

Figure 4:
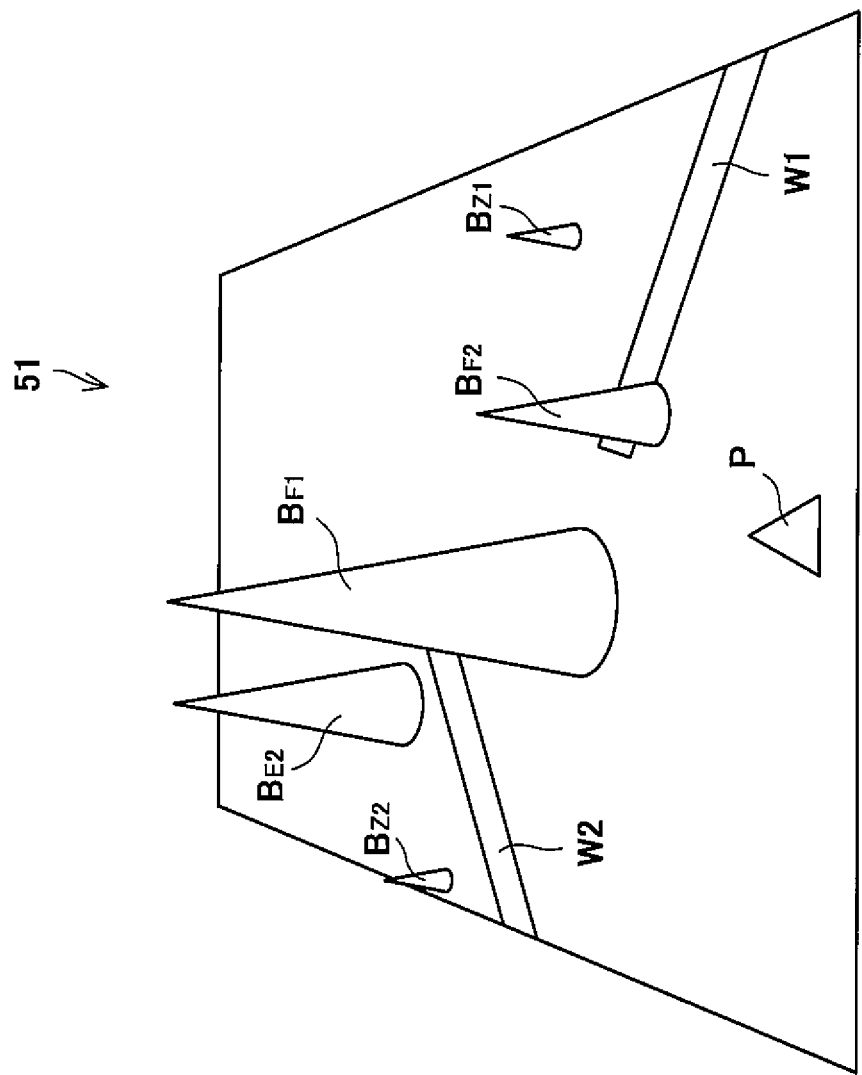
FIG. 4 is an enlarged view of a simplified map display unit shown in FIG. 3.

A simplified map display unit 51 is provided on the main game image in the game screen image 50. FIG. 4 is an enlarged view of the simplified map display unit 51 shown in FIG. 3. The map display unit 44 simply displays in the simplified map display unit 51 the game space located in a predetermined region including the position of the player character C1. Examples of such simple display mode include: monotone display; two-dimensional display of geographical features, objects, and the like; and low resolution versions of the monotone display and the two-dimensional display. It should be noted that the predetermined region displayed in the simplified map display unit 51 may be smaller than, larger than, or the same in size as the range of the image, taken by the virtual camera, in the game screen image 50. A current position P of the player character C1 operated by the user is displayed on the simplified map display unit 51. Further, the simplified map display unit 51 may be displayed as a three-dimensional image as shown in FIGS. 3 and 4 or an image when viewed from above (a two-dimensional image).

The sound generated place display unit 45 displays the sound generated place at a corresponding position on the simplified map shown in the simplified map display unit 51. The sound generated place is shown by a display object B having a conical shape. For ease of understanding of relations among sound generation sources and corresponding display bodies B, reference signs in FIG. 4 are prepared by attaching each reference sign shown in the game screen image 50 of FIG. 3 to a letter "B." For example, a display object $B_{F1}$ denotes a display object corresponding to the explosion effect F1.

The sound detecting unit 43 detects volume of the sound generated at the sound generated place. The sound generated place display unit 45 displays the display object at the sound generated place, the display object varying depending on the volume of the sound. In the present embodiment, the size of the display object B (i.e., an area of a bottom surface of the display object B and a height of the display object B) increases as the volume of the sound increases.

For example, explosion sound and gunfire sound are relatively large sound. Therefore, each of the display object $B_{F1}$ indicating the explosion sound and a display object $B_{E2}$ indicating the gunfire sound of the enemy character E2 is large in height and therefore large in the area of the bottom surface. On the other hand, footstep sound of the character is relatively small sound. Therefore, each of display bodies $B_{Z1}$ and $B_{Z2}$ indicating sound of movements of the zombie characters Z1 and Z2 is small in height and therefore small in the area of the bottom surface. Further, smaller sound is drowned by larger sound generated at a place close to the player character C1. Therefore, the display object indicating the sound of the movement of the enemy character E1 is not displayed since it is integrated with a display object $B_{F2}$ indicating operation sound of the ventilation fan F2 that is a larger sound generation source located near the enemy character E1.

In addition to the above, examples of the sound which may be displayed as the display object include: sound generated based on the actions of the character; and environmental sound generated from objects and the like provided in the virtual game space irrespective of the actions of the character. Examples of the sound generated based on the actions of the character include: sound generated when a character uses stairs, ladders, or the like; sound of opening and closing of a door; sound generated when a weapon which is required to be reloaded is reloaded; sound generated when a thing is placed; sound generated when a rod or the like is swung or thrown to collide with a wall or the like; sound of shout; and start-up sound of an electronic device or the like. Examples of the environmental sound generated from objects and the like provided in the virtual game space irrespective of the actions of the character include: sound of buzzer; sound of waterdrop fall; sound of water flow; and sound generated when sparks fly by an electric leak. In the present game, the action of the player character C1 may be stepwisely or continuously changed based on the operation of the user in a range from a slow action to a quick action. In this case, the volume of the sound generated by the player character C1 may decrease as the action becomes slower, and the volume of the sound generated by the player character C1 may increase as the action becomes quicker.

For example, the display object $B_{F1}$ indicating the explosion sound drastically becomes large when the explosion occurs. The size of the display object $B_{F1}$ is maintained for a certain period of time. As the display of the explosion effect F1 becomes smaller, the size of the display object $B_{F1}$ decreases. When the display of the explosion effect F1 disappears, the display object $B_{F1}$ is also deleted. Further, when the enemy character E2 who has fired a gun has moved quietly after the gunfire, the position of the enemy character E2 may be away from the position of the display of the display object $B_{E2}$ after the disappearance of the display object $B_{E2}$ indicating the gunfire sound.

According to the above configuration, the user can specify the sound generated place in the virtual game space. When the sound generated place is located near the player character C1, the user can actually listen to the sound, so that the user can relatively easily specify what the sound is. In contrast, when the sound generated place is located far away from the player character C1, the user cannot listen to the sound itself, so that it is difficult for the user to specify what the sound is. Therefore, to find out what the sound generated at the place away from the player character C1 is, the user needs to further determine, for example, whether to approach the sound generated place while taking a risk of being easily attacked by the hiding enemy characters E1 and E2 and the like. Needless to say, the user who operates the player character C1 needs to determine depending on a situation whether to act quickly even while making sound or act quietly without making sound. By showing the sound generated place in the game space as above, the reduction of the strategic effect can be suppressed, and the game urging the user to make various determinations can be realized.

Further, in the present embodiment, the sizes of the display bodies B indicating the respective sound generated places change depending on the volumes of the sounds at the places. Therefore, it is possible to provide high strategic game of determining what the sound indicated by the display object B is from the volume of the sound and ways (such as a time at which the sound is generated and the magnitude of the change of the sound) of the generation of the sound. Further, as described above, in the vicinity of the large sound generated place, small sound is drowned by the large sound. Therefore, it is possible to provide high strategic game in which, for example, when a character hides at a place (such as the ventilation fan F2) where large sound is always generated, the existence of the character is hardly noticed by an opponent character. Especially in a mode in which the area of the bottom surface of the display object increases as the volume of the sound increases like the display object B in the present embodiment, the sound generated by the player character C1 can be deleted in a predetermined range including an object or the like which generates the large sound, and the player character C1 does not have to be located at the same position as the object. As above, according to the present embodiment, the strategic effect can be diversified.

In the game with reality as described above, sound such as footstep sound of characters and gunfire sound are reproduced. Based on the sound, the user can determine information regarding, for example, whether or not the enemy character exists nearby. However, if an actual space (space around the user) is under an environment (noisy environment) where the user cannot catch sound, and even when sound such as the footstep sound of the character or the gunfire sound is reproduced, the user cannot catch the sound, and this is disadvantageous for the user. For example, the user does not notice the footstep sound of the enemy character and therefore is abruptly attacked by the enemy character. According to the present embodiment, even if the actual space is under an environment (noisy environment) where the user cannot catch sound, the user can recognize the sound information. Therefore, it is possible to provide a game that is fair regardless of the environment around the user.

It should be noted that in the present embodiment, the display object B is shown by a single display mode regardless of the characteristic and type of the sound generation source. With this, it is possible to provide the game in which the user guesses and determines the sound generation source shown by the display object B based on the position of the sound shown by the display object B, the volume of the sound, the way of change of the sound, whether or not the sound generated place moves, and the like.

Further, the conical display object B may have a shape formed by superimposing a wave shape, which simulates a sound wave, on a basic shape that is the conical shape. Furthermore, the display object B may be configured such that: small values are randomly added to or subtracted from the volume of the sound shown by the display object B; and even when the volume of the sound is constant, the size of the display object B minutely changes.

The size of the display object B is determined based on a volume generated by subjecting predetermined inverse interpolation processing to an interpolation volume corresponding to a distance between the position of the player character C1 and the sound generated place. Specifically, the size of the display object B is determined as below. First, based on the position of the player character C1, a sound listening position is set in the vicinity of the position of the player character C1. When sound is generated in the game main story, the control unit 4 interpolates the volume of the sound in accordance with a distance between the sound generated place and the listening position to output the sound through the speaker 22. More specifically, the control unit 4 reproduces the sound at the volume equal to the volume at the sound generated place when the distance between the sound generated place and the listening position is short, and the control unit 4 reproduces the sound at the volume smaller than the volume at the sound generated place when the distance is long. Further, for example, an attenuation rate of the sound which attenuates when the distance increases may differ depending on the type of the sound. Therefore, sounds are associated with interpolation functions, corresponding to differences of the types of the sounds, to be stored.

Figure 5A:
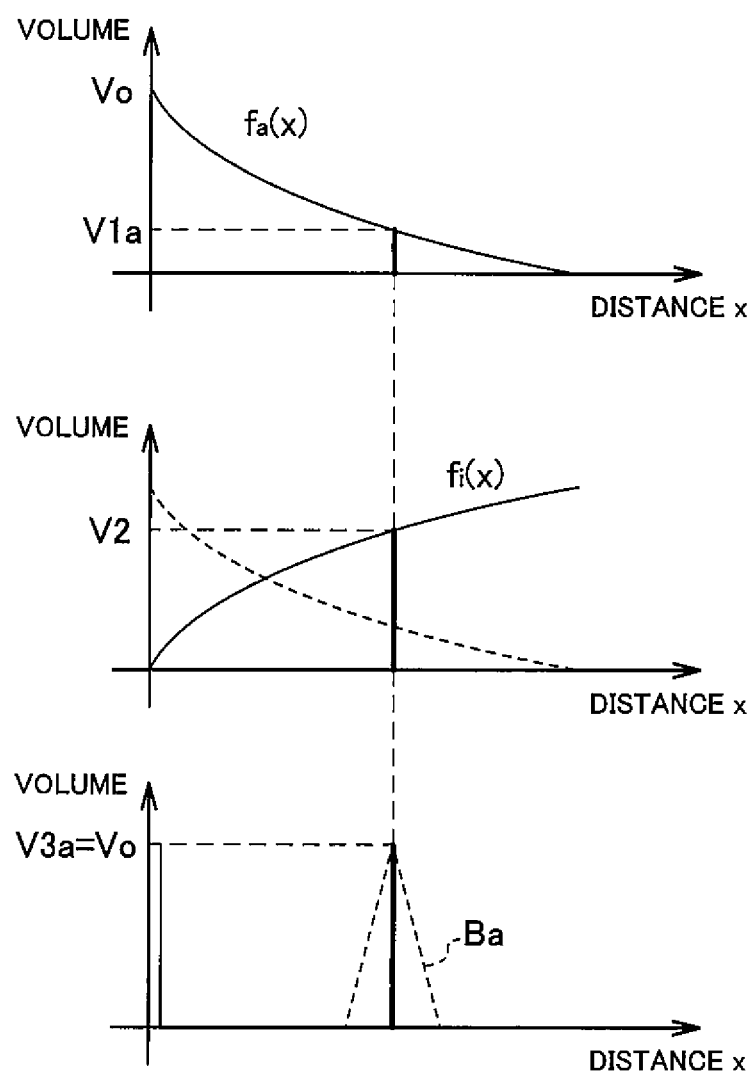
FIG. 5A is a diagram for explaining calculation processing for a size of a display object in the present embodiment.
Figure 5B:
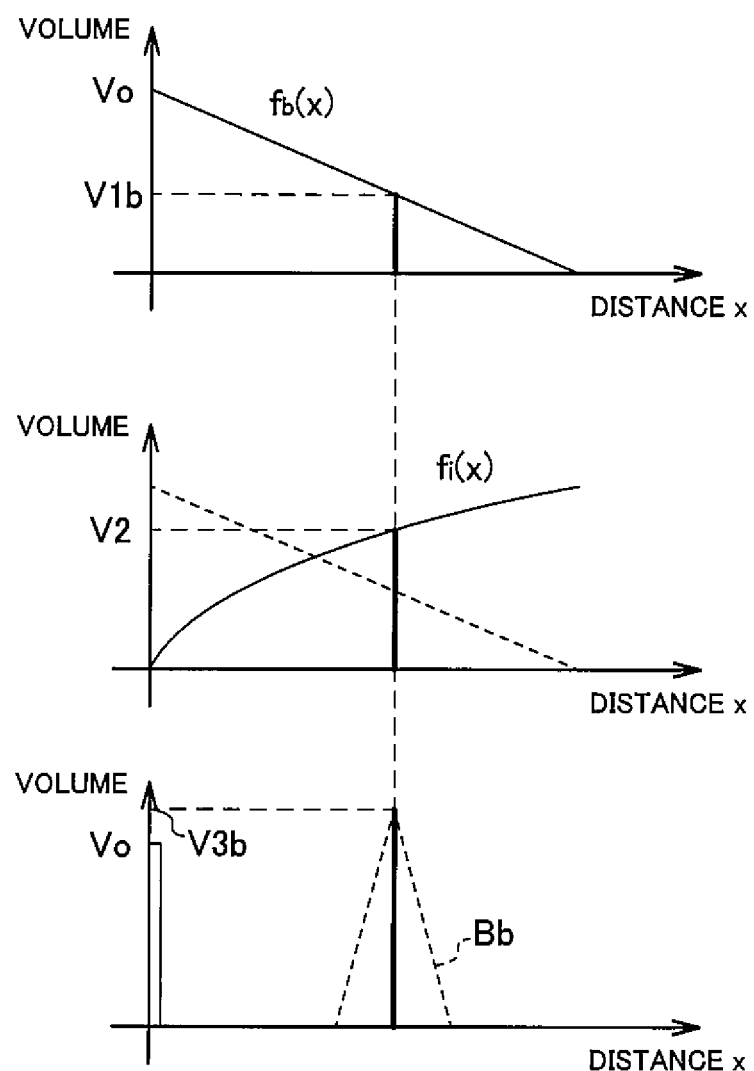
FIG. 5B is a diagram for explaining the calculation processing for the size of the display object in the present embodiment.

FIGS. 5A and 5B are diagrams each for explaining calculation processing for the size of the display object in the present embodiment. FIG. 5A shows a calculation process for sound to which an interpolation function $f_a(x)$ is applied. FIG. 5B shows a calculation process for sound to which an interpolation function $f_b(x)$ is applied. The interpolation function $f_a(x)$ is a function set such that the volume of the sound attenuates like a quadratic function as a distance x between the listening position of the player character C1 and the sound generated place increases. The interpolation function $f_b(x)$ is a function set such that the volume of the sound attenuates like a linear function as the distance x increases. It should be noted that to facilitate comparison, in FIGS. 5A and 5B, the volume of the sound at the generated place (x=0) is set to a common volume Vo.

When displaying a display object Ba (Bb), the sound generated place display unit 45 applies the interpolation function $f_a(x)$ or $f_b(x)$, corresponding to the type of the generated sound, to the volume of the sound at the sound generated place to calculate an interpolation volume V1a (V1b) obtained by interpolating the volume of the generated sound in accordance with the distance between the sound listening position of the player character C1 and the sound generated place (see upper graphs in FIGS. 5A and 5B).

Further, the sound generated place display unit 45 calculates a volume obtained by subjecting the interpolation volume V1a (V1b) to a predetermined inverse interpolation in accordance with the distance x. Specifically, for example, the sound generated place display unit 45 calculates a value (inverse interpolation volume) V2 corresponding to the distance x in a predetermined inverse interpolation function $f_i(x)$ set such that the volume of the sound increases as the distance x increases (see middle graphs in FIGS. 5A and 5B). Further, as a reference volume of the display object Ba (Bb), the sound generated place display unit 45 calculates a values V3a (=V1a+V2) (a value V3b (=V1b+V2)) obtained by adding the inverse interpolation volume V2 to the interpolation volume V1a (V1b). The sound generated place display unit 45 sets the size of the display object Ba (Bb) based on the calculated reference volume (see lower graphs in FIGS. 5A and 5B).

The inverse interpolation function $f_i(x)$ does not depend on the type of the sound. Therefore, even when two sounds which are different from each other in terms of the interpolation functions $f_a(x)$ and $f_b(x)$ are generated at the same volume at positions away from the player character C1 by the same distance x, the sizes of the display bodies Ba and Bb displayed on the simplified map display unit 51 are different from each other. For example, as shown in FIG. 5A, when the inverse interpolation function $f_i(x)$ is a function that completely interpolates the interpolation function $f_a(x)$, a volume V3a that is a reference of the size of the display object Ba becomes equal to the volume Vo at the sound generated place.

In contrast, as shown in FIG. 5B, when the inverse interpolation function $f_i(x)$ is a function that does not completely interpolate the interpolation function $f_b(x)$, a volume V3b that is a reference of the size of the display object Bb becomes different from the volume Vo at the sound generated place (in FIG. 5B, the volume V3b becomes larger than the volume Vo). Then, as the distance x increases, an inverse interpolation rate (rate of the volume V2 in the volume V3b) by the inverse interpolation function $f_i(x)$ increases. As a result, as the distance x increases, an error between the volume V3b that is the reference of the size of the display object Bb and the volume Vo at the sound generated place increases.

While changing the interpolation functions $f_a(x)$ and $f_b(x)$ depending on the type of the sound, the inverse interpolation function $f_i(x)$ is set as a function (common function) that does not depend on the type of the sound. With this, information regarding the volume shown by the display object B becomes inaccurate as the sound generation source separates farther from the position (listening position) of the player character C1. Therefore, it is difficult for the user who operates the player character C1 to determine the sound generation source from the display object B that is based on the sound generated at a position far away from the player character C1. On this account, the sound generation source is unknown for the user, and the user is required to determine whether to approach the sound generated place.

As above, by changing the accuracy of the volume information shown by the display object B in accordance with the distance x, the reduction of the strategic effect can be suppressed, and the game of urging the used to make various determinations can be realized.

It should be noted that when the distance x is not less than a predetermined distance, the display object B may be displayed based on a predetermined fixed value (the volume of the sound and a period during which the sound is generated) or a fixed function without performing the interpolation and the inverse interpolation. Information regarding the sound generated at a position far away from the player character C1 is not relatively regarded as important, so that by simplifying its calculation, processing load of the control unit 4 can be reduced.

The foregoing has explained the embodiment of the present invention. However, the present invention is not limited to the above embodiment, and various improvements, changes, and modifications may be made within the scope of the present invention.

In the above embodiment, the height of the conical shape of the display object B and the area of the bottom surface of the display object B change depending on the volume of the sound. However, only the height may be changed, and the area of the bottom surface may be constant. Or, the display object B may be displayed two-dimensionally, and the area of the display object B may be changed depending on the volume of the sound. The shape (basic shape) of the display object B may be a shape, such as a columnar shape, a prism shape, or a pyramid shape, other than the conical shape. In the above embodiment, the size of the display object B changes depending on the volume of the sound. In addition to this or instead of this, a color of the display object B may change depending on the volume of the sound.

In the above embodiment, the simplified map display unit 51 is always displayed in the game screen image 50. However, the above embodiment is not limited to this. For example, at the time of the initial settings before starting the game main story, the user may select to possess equipment (sound radar) as equipment of the player character C1, the equipment (sound radar) being capable of displaying the sound generated place on the simplified map display unit 51, and as a result, the user may be able to use the sound radar in the game main story. In addition to this or instead of this, after the game main story is started, the user may obtain the sound radar as an item or equipment, and after the user obtains the sound radar, the sound radar may be able to be used based on the operation of the user. In the game main story, the simplified map display unit 51 may be always displayed in the game screen image 50 or outside the game screen image 50. Or, in the game main story, the simplified map display unit 51 may be displayed in the game screen image 50 or outside the game screen image 50 only when the sound radar is being used.

Further, instead of displaying the simplified map, showing the sound generated place, in the simplified map display unit 51, the main game image itself may be displayed as the simplified map showing the sound generated place when an item or the like is used. For example, a goggle-shaped or binoculars-shaped sound radar may be set as an item possessed by the player character C1. In this case, when the user possesses the sound radar, and the player character C1 is equipped with or uses the sound radar, the sound generated place can be displayed in the field of view of the player character C1.

The above embodiment has explained a stationary game device. However, the present invention is suitably applicable to mobile game devices, mobile phones, and computers such as personal computers.

INDUSTRIAL APPLICABILITY

The present invention is useful to provide a game including a high strategic effect to users by using sound information in games.

REFERENCE SIGNS LIST

2 game device
30*a* game program
30*b* game data
41 virtual space generating unit
42 character control unit
43 sound detecting unit
44 map display unit
45 sound generated place display unit
46 communication unit

The invention claimed is:
1. A game system comprising:
a display unit configured to display as a game screen image an image taken by a virtual camera provided in a virtual space, the display unit configured to display the image in a predetermined angle;
an operating unit configured to operate a player character who acts in the virtual space; and
a control unit configured to advance a game in accordance with an operation of a user to the operating unit, wherein
the control unit includes:
a virtual space generating unit configured to generate the virtual space and display the virtual space on the display unit;
a character control unit configured to control an action of the player character based on the operation of the operating unit by the user;
a sound detecting unit configured to detect a sound generated place in a predetermined region determined based on a position of the player character in the virtual space;
a map display unit configured to display a simplified image corresponding to the image on a simplified map in the game screen image, the simplified map displaying the predetermined region of the virtual space; and
a sound generated place display unit configured to display the sound generated place in the predetermined region at a corresponding position on the simplified map,
the sound generated place display unit configured to display a display object at a position on the simplified map,
the display object having a conical shape,
an area of a bottom surface of the display object and a height of the display object increasing as the volume of the sound increases.
2. The game system according to claim 1, wherein:
the sound detecting unit detects volume of sound generated at the generated place,
the position corresponds to the sound generated place, and
the display object varies depending on the volume of the sound.
3. A method of controlling a game system,
the method comprising:
a virtual space generating step of generating a virtual space and displaying an image as a game screen image on a display unit connected to the game system, the image being taken by a virtual camera provided in the virtual space in a predetermined angle;
a character controlling step of controlling an action of a player character based on an operation of an operating unit by a user, the player character acting in the virtual space;
a sound detecting step of detecting a sound generated place in a predetermined region determined based on a position of the player character in the virtual space;
a map displaying step of displaying a simplified image corresponding to the image on a simplified map in the game screen image, the simplified map displaying the predetermined region of the virtual space; and
a sound generated place display step of displaying the sound generated place in the predetermined region at a corresponding position on the simplified map, and displaying a display object at a position on the simplified map,
the display object having a conical shape,
an area of a bottom surface of the display object and a height of the display object increasing as the volume of the sound increases.
4. The method according to claim 3, wherein:
the sound detecting step detects volume of sound generated at the generated place; and
the position corresponds to the sound generated place, and the display object varies depending on the volume of the sound.
5. A nonvolatile recording medium storing a command executable by a control unit of a computer device, the nonvolatile recording medium being readable by the computer device,
the command including:
a virtual space generating step of generating a virtual space and displaying an image as a game screen image on a display unit connected to a game system, the image being taken by a virtual camera provided in the virtual space, the display unit configured to display the image in a predetermined angle;

a character controlling step of controlling an action of a player character based on an operation of an operating unit by a user, the player character acting in the virtual space;

a sound detecting step of detecting a sound generated place in a predetermined region determined based on a position of the player character in the virtual space;

a map displaying step of displaying a simplified image corresponding to the image on a simplified map in the game screen image, the simplified map displaying the predetermined region of the virtual space; and a sound generated place display step of displaying the sound generated place in the predetermined region at a corresponding position on the simplified map, and displaying a display object at a position on the simplified map, the display object having a conical shape, an area of a bottom surface of the display object and a height of the display object increasing as the volume of the sound increases.

6. The nonvolatile recording medium according to claim 5, wherein:

the sound detecting step detects volume of sound generated at the generated place; and the position corresponds to the sound generated place, and the display object varies depending on the volume of the sound.

7. The game system according to claim 1, wherein the map display unit is configured to display the simplified image in the predetermined angle.

* * * * *